Oct. 29, 1974  D. L. DUKES ET AL  3,845,021

POLYUREA-URETHANE SHOCK ABSORBING COMPOSITIONS

Original Filed Sept. 11, 1970

INVENTORS
CHARLES J. PEARSON
BY DAVID L. DUKES

ATTORNEY

United States Patent Office 3,845,021
Patented Oct. 29, 1974

3,845,021
POLYUREA-URETHANE SHOCK ABSORBING
COMPOSITIONS
David L. Dukes, Kent, and Charles J. Pearson, Akron,
Ohio, assignors to The Goodyear Tire & Rubber Company, Akron, Ohio
Continuation of application Ser. No. 71,555, Sept. 11,
1970. This application Mar. 8, 1972, Ser. No. 232,727
Int. Cl. B61g 9/02; C08g 11/06; F16f 7/00
U.S. Cl. 260—75 NH
2 Claims

ABSTRACT OF THE DISCLOSURE

A shock absorbing polyurea-urethane composition and a shaped railroad draft gear unit prepared therefrom, having rigid force-receiving plates adhered thereto, and suitable for use as a bridge support pad, where the said composition is prepared by reacting diamines selected from orthodichlorobenzidine and 4,4'-methylene-bis-orthochloroaniline with the reaction product of 3,3'-bitolylene-4,4'-diisocyanate and polyether polyols and polyester polyols of various required compositions and molecular weights.

---

This is a continuation of application Ser. No. 71,555, filed Sept. 11, 1970.

This invention relates to a resilient cured polyurea-urethane compositions suitable for shock absorbing elements and to a method for their preparation. It also relates to resilient compositions having a good shock absorbing ability over a relatively wide temperature range. The invention more specifically relates to shock absorbing elements for draft gears in railroad cars and for bridge support pads.

Shock absorbing compositions having an ability to absorb large shocks over a relatively wide range of load values have long been sought. Furthermore, shock absorbing compositions having the ability to absorb such large shocks over a relatively wide range of medium to low temperatures, such as at least from about 50° C. to about —40° C., have also been long sought. Examples of such desired shock absorbing compositions are shaped compositions as element or units for railroad draft gears and for bridge support pads. Both types of units are required to successfully absorb shocks over a wide range of load values and over a relatively wide range of temperatures.

Railroad draft gears are shock absorbing devices used on railroad cars to absorb substantial shocks resulting from the coupling of the railroad cars. Various devices have been used for such draft gears. The steel spring could be used for such a device primarily because it has good shock absorbing characteristics at both low and very high load values. Its ratio of compression to an applied load is substantially constant over a wide range of applied load values However, steel springs are not practical for use as draft gears in railroad cars because a very large size would be required.

Consequently, shock absorbing devices have been fabricated from other materials such as rubber and other elastomers, and used for draft gears. One type of shock absorbing device has comprised a series of shock absorbing units or pads in the general shape of a disc with concave sides. Each shock absorbing unit in the series comprised a resilient solid rubber or rubber-like element disposed between and attached to two opposing force-receiving supports or plates. The shock absorbing units or pads were disposed in series to the shock load by placing them in a cylinder with their planar surfaces facing each other. The side-walls of the rubber-like elements were generally concave. Thus, as a shock or a load was applied to the draft gear, the series of shock absorbing units offered a cooperative cushioning or shock absorbing resistance to the applied load and, upon being compressed by the load, the rubber-like elements deformed laterally and their side-walls were forced into the space provided between the concave sides of the rubber-like elements and the side of the cylinder.

However, the shock absorbing devices generally have shock absorbing characteristics substantially inferior to that of a steel spring over a wide range of load values. The devices typically have good shock absorbing characteristics at low loading values and poor shock absorbing characteristics at high loads. Usually their resistance to compression substantially increases at high load values. They can even exhibit excessive compression set and have low endurance under repeated stress. They can bottom out at high shocks. Thus, under the heavy repetitive shock loads to which a draft gear is subject, such a shock absorbing device can have relatively little shock absorbing value.

An exception to such disadvantageous shock absorbers are those described and claimed in U.S. Pat. 3,504,901 which provides elements or units having desirable load versus deflection characteristics and dynamic stability over a wide range of load values suitable for use in a draft gear. However, even these shock absorbing units have serious disadvantages since at low temperatures, such as below about —20° C. they tend to stiffen and/or transmit shock directly to the railroad car without absorption with extensive shock loads. Furthermore, compressive set tends to become a serious problem with these shock absorbers at low temperatures. Compressive set is evidenced by a relatively slow rate of the absorber returning to its original shape after removal of a compression force.

Thus, in view of these substantial and demanding shock absorbing requirements, it is an object of this invention to provide an improved resilient shock absorbing composition. It is a further object to provide such a composition suitable as a shaped element for railroad draft gears and for bridge support pads.

In accordance with this invention, it was discovered that improved shock absorbing compositions are certain resilient polyurea-urethane compositions characterized by deflecting from about 0.3 to about 0.6 inch, preferably from about 0.4 to about 0.5 inch, at about 25° C. upon the application of about 1800 pounds per square inch uniformly to the end surface areas (force-receiving surfaces) of the said resilient compositions when the said compositions are generally disc shaped cylindrical elements with circular parallel end surfaces having diameters of about 6.5 inches, a height of about 1.5 inches, and a side-wall connecting the end surfaces substantially in the form of a V-shaped groove having substantially equal length sides, the said groove extending between the said end surfaces, the volume of the solid portion of the said elements being about 150 percent of the volume of the said groove. In further accordance with this invention, it was discovered that an improved draft gear unit or pad having good shock absorbing characteristics over a wide range of load values and through a wide temperature range comprises such a composition having the deflection characteristic at about 25° C. and particularly when comprising such a shaped element having substantially rigid force-receiving plates adhered to its end surface areas (force-receiving surfaces).

Thus, a shock absorbing unit of this invention, suitable for use in a railroad draft gear, comprises a shock absorbing element, the said element comprising a solid disc shaped resilient, polyurea-urethane composition of this invention having the said deflection characteristic of about 25° C. and having two opposing and substantially parallel force-receiving surfaces connected by at least one sidewall, preferably a concave sidewall, and having rigid force-receiving plates, preferably metal plates, adhered to its force-receiving surfaces. Correspondingly, the shock absorbing device of a railroad draft gear comprises a series of such units, such as about 8 to about 12 and preferably 10, loaded in a cylinder in series to the shock load, with their force-receiving plates facing each other.

In additional accordance with this invention, a bridge pad is provided comprising a shaped resilient polyurea-urethane composition of this invention supportably and shock absorbingly positioned between a bridge load carrying member and a bridge foundation member. The invention thus further relates to the bridge construction resulting therefrom, comprising the bridge load carrying member shock adsorbingly supported on its foundation member by the said shaped polyurea-urethane composition.

The resilient polyurea-urethane compositions of this invention are preferably further characterized by a —40° C. cold temperature compression test in addition to the deflection characterization test at about 25° C. According to this test, the said composition, at about —40° C., when shaped and cured to a solid, circular disc with a straight side-wall, having a diameter of about 1.13 inch and a thickness of about 0.5 inch, requires a maximum pressure of 7,500, and preferably a maximum pressure of 6,000, pounds per square inch, applied to its flat surfaces to compress the disc 40 percent. This cold temperature compression test is a measure of stiffening of the polyurea-urethane composition at low temperatures. It is a measure of the composition's ability to absorb energy without hardening and transmitting shock directly without absorption. A shock absorber of this invention has essentially bottomed out when its percent compression is substantially constant and its percent compression versus load curve substantially horizontal at high load values. The quality of high energy absorption without bottoming out is particularly required for railroad draft gears which are subject to large shocks over a relatively wide range of temperatures including temperatures down to about —40° C.

The shaped resilient shock absorbing polyurea-urethane compositions of this invention are prepared by shaping and curing a polyurea-urethane reaction mixture. The basic polyurea-urethane compositions of this invention suitable for the said shock absorbing units and bridge pads are prepared from a reaction mixture by reacting at least one diamine selected from the group consisting of ortho-dichlorobenzidine and 4,4'-methylene bis - orthochloro-aniline with the reaction product of 3,3'-bitolylene-4,4'-diisocyanate and reactive hydrogen containing polymeric materials selected from (1) polytetramethylene ether glycols having an average molecular weight in the range of from about 800 to about 2,200 with a total average molecular weight in the range of about 1,200 to about 1,500, preferably about 1,250 to about 1,450, or (2) a mixture of reactive hydrogen-containing materials comprising in the range of from about 30 to about 100 weight percent polytetramethylene ether glycols having an average molecular weight of from about 800 to about 2,200 and correspondingly in the range of up to about 70 weight percent of polyester polyols having a molecular weight in the range of from about 800 to about 2,200 selected from at least one of (a) caprolactone polyesters prepared from caprolactones containing 6 to 10, preferably 6, carbon atoms and glycols containing 2 to 10, preferably 4 to 6, carbon atoms, (b) adipates of adipic acid and glycols containing 2 to 7, preferably 4 to 6, carbon atoms and (c) azelates of azelaic acid and glycols containing 2 to 7, preferably 4 to 6, carbon atoms, with the requirement that the total average molecular weight of the mixture of polyether polyol (polytetramethylene ether glycol) and polyester polyol is in the range of about 1,300 to about 1,900 and preferably about 1,400 to about 1,800.

In the specification, the term "total average molecular weight" used to describe total resulting molecular weight of a mixture of the polyether polyols (polytetramethylene ether glycols) and the mixtures of polyether polyols and polyester polyols. Thus, such a mixture having a total average molecular weight of 1,400 can consist of such polyols having, for example, molecular weights of 1,000, 1,250 and 2,000.

Thus, the polyether polyol-polyester polyol mixtures of this invention using a polyether polyol having an average molecular weight in the range of from about 1,000, preferably about 1,200, to about 2,200, can generally contain up to about 70 weight percent of the polyester polyols having an average molecular weight in the range of from about 1,800 to about 2,200 or generally up to about 30 weight percent of the polyester polyols having an average molecular weight in the range of from about 800 to about 1,200, providing the total average molecular weight of the mixture is in the range of from about 1,300 to about 1,900, and preferably from about 1,400 to about 1,800.

Preferably, the polyether polyol-polyester polyol mixture is comprised of polytetramethylene ether glycol having a total average molecular weight in the range of from about 1,400 to about 1,600 selected from such polyether polyols having a molecular weight in the range of about 900 to about 2,100, and the polyester product of ε-caprolactone and diethylene glycol having an average molecular weight in the range of about 1,200 to about 2,200, preferably from about 1,800 to about 2,100, with a total average molecular weight of the polyether polyol-polyester polyol mixture in the range of about 1,400 to about 1,800.

It is a critical feature of this invention that the ratio of isocyanato groups of the diisocyanate to the sum of the hydroxyl groups of the polyether polyol (polytetramethylene ether glycol) and polyester polyol is from about 1.7 to about 2.5 and preferably from about 1.7 to about 2.0.

It is preferred that a sufficient amount of diamine is used to provide a ratio of primary amino groups to excess isocyanato groups of the diisocyanate over the sum of the hydroxyl groups of the polyether polyols and polyester polyols (reactive hydrogen-containing materials) in the range of about 0.6 to about 1 and preferably from about 0.7 to about 0.95. Thus, for example, it is desired that from about 0.4 to about 1.1 moles of the diamine is added to the reaction product of the mixture comprising correspondingly from about 1.7 to about 2.5 moles, preferably from about 1.8 to about 2.0 moles, of the diisocyanate and about 1 mole of the polyether polyol or mixture of polyether polyol and polyester polyol.

It is a further required feature of this invention that the polytetramethylene ether glycols, the caprolactone polyesters, the adipates, the azelates and their mixture have an acid number of less than about 1, desirably less than about 0.5 and more preferably less than about 0.1.

In the practice of this invention, it may be convenient to provide the polytetramethylene ether glycol, typically prepared from tetrahydrofuran with the aid of an alkylene oxide initiator having 2 to 4 carbon atoms, such as ethylene oxide, of a molecular weight in the range of about 800 to about 2200 as a mixture of such polymeric polyols selected from polyols having a molecular weight in the range of from about 800 to about 1200 and from polyols in the range of from about a 1800 to about a 2200 molecular weight.

The caprolactone polyesters are substantially linear, hydroxyl terminated polymers prepared by reacting a caprolactone having 6 to about 10 carbon atoms in the ring, preferably 6 carbon atoms, with a glycol having 2 to 10 carbon atoms and preferably 2 to 4 carbons. Various suitable caprolactones include ε-caprolactone, zeta-caprolactone and eta-caprolactone. Alkyl substituted caprolactones can be used with alkyl substituents containing 1 to 4 carbon atoms selected from methyl, ethyl, propyl, i-propyl, butyl and i-butyl radicals, such as methyl ε-caprolactone. Desirably, the caprolactone polyester has a molecular weight in the range of about 800 to about 2200, preferably about 1200 to about 2100, with corresponding hydroxyl numbers in the range of about 140 to about 45 and about 95 to about 55 respectively.

The adipates and azelates preferably have a molecular weight in the range of about 800 to about 2200 with a corresponding hydroxyl number in the range of about 140 to about 50.

Various suitable glycols include straight chain aliphatic hydrocarbon diols, preferably hydroxyl terminated diols, and alkylene ether glycols, preferably hydroxyl terminated, for preparing the caprolactone polyesters, the adipates and the azelates. Representative of the straight chain aliphatic hydrocarbon hydroxyl terminated diols are ethylene glycol, 1,3-propane diol, 1,4-butane diol, 1,5-pentane diol, 1,6-hexane diol, 1,7-heptane diol. Representative of alkylane ether glycols is diethylene glycol. The hydrocarbon diols are generally desired for the adipates and azelates with the 1,4-butane diol and 1,6-hexane diol being preferred. The caprolactone polyester of ε-caprolactone and diethylene glycol and polyesters selected from tetramethylene adipate, 1,6-hexane diol adipate, tetramethylene azelate and 1,6-hexane diol azelate are particularly desirable. The tetramethylene adipates and azelates are, of course, prepared from 1,4-butane diol and appropriate acid. The polyesters are typically formed at a temperature of from about 50° C. to about 300° C. and preferably in the range of about 120° C. and 200° C. A catalyst can be used to increase the reaction rate, if desired. For a more detailed description of preparation of various suitable caprolactone polyesters, reference is made to U.S. Pat. 2,933,478.

The resilient polyurea-urethane composition can be prepared by first reacting the polyether polyol or polyether polyol and polyester polyol with the diisocyanate under substantially anhydrous conditions at a temperature of from about 100° C. to about 150° C. for about 30 to about 60 minutes. This reaction can be conducted at atmospheric or above or below atmospheric pressure. A catalyst can be added to the diisocyanate-polymeric polyol or polyol and polyester reaction mixture to reduce its reaction time. When such a catalyst is used, it is usually added to the reaction mixture before the addition of the diisocyanate or with the addition of the diisocyanate. Various catalysts can be used exemplary of which are the amine catalysts, such as triethyl amine, n-methyl-morpholine, and n-ethyl morpholine.

The diamine curative is then added to and mixed with the polymeric product of this reaction, sometimes called a prepolymer, under essentially anhydrous conditions. The resulting polyurea-urethane reaction mixture is then cast in a suitable mold and cured to form the shaped resilient polyurea-urethane composition of this invention. The said reaction mixture can be cured at about 20° C. to about 50° C., although faster cures can be obtained at higher temperatures, for example, about 50° C. to about 200° C. Normally, the reaction mixture is allowed to cure at 120° C. from 16 to about 24 hours.

When the shaped resilient polyure-urethane composition is prepared by pouring the polyurea-urethane reaction mixture into a mold having the desired configuration and then curing the polyurea-urethane reaction mixture, metal plates suitable for use as force-receiving plates for the shock absorbing device of this invention can be placed in the mold before curing the polyurea-urethane reaction mixture. If desired, a suitable bonding cement, such as a phenolic or polyester-polyisocyanate adhesive, may be applied to the metal plates. Exemplary are the cements taught to be useful in U.S. Pat. 2,992,939 and Australian Pat. 256,373. By curing the polyurea-urethane reaction mixture in the presence of the said metal plates, a metal plate is adhered to at least one of the force-receiving surfaces of the polyurea-urethane member to form a laminate of the structure shown in FIGS. 1 and 2, for instance. Suitable metal plates generally conform to the planar dimensions of the force-receiving surfaces of the shock absorbing units and have a thickness in the range of from about 1/16 to about 1/2 inch, preferably from about 1/8 to about 1/4 inch, or from about 100 to about 200 mils. It is preferable to use steel plates for the force-receiving surfaces, such as hot-rolled mild steel having a carbon content in the range of from about a 10/15 to about a 10/30 Society of Automotive Engineers' (SAE) classification.

For further understanding of the invention, reference may be had to the accompanying drawing in which.

Figure 1:
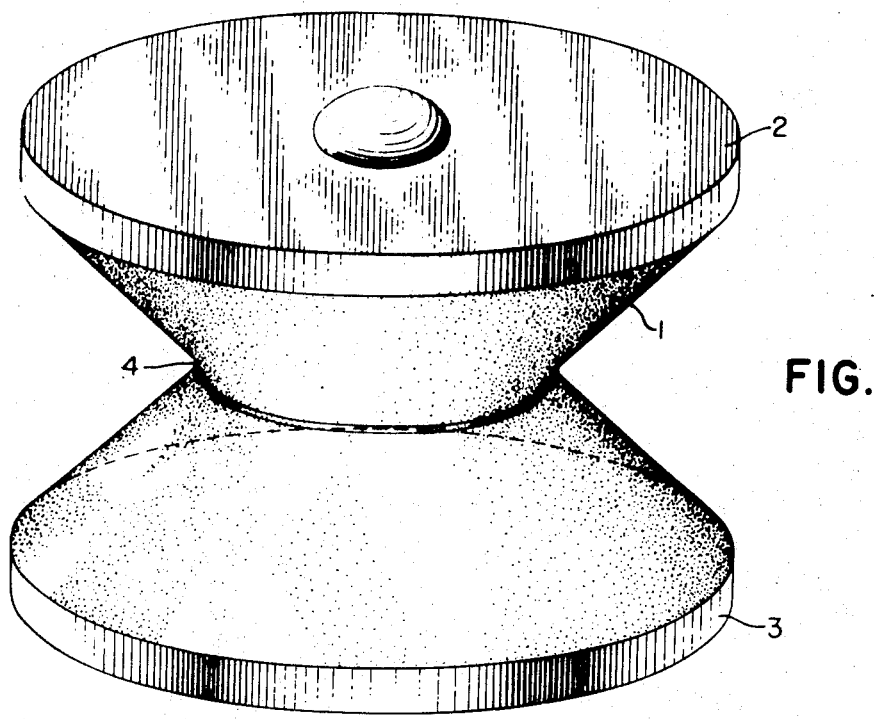
FIG. 1 is a perspective view illustrating one form of the shock absorbing device.
Figure 3:
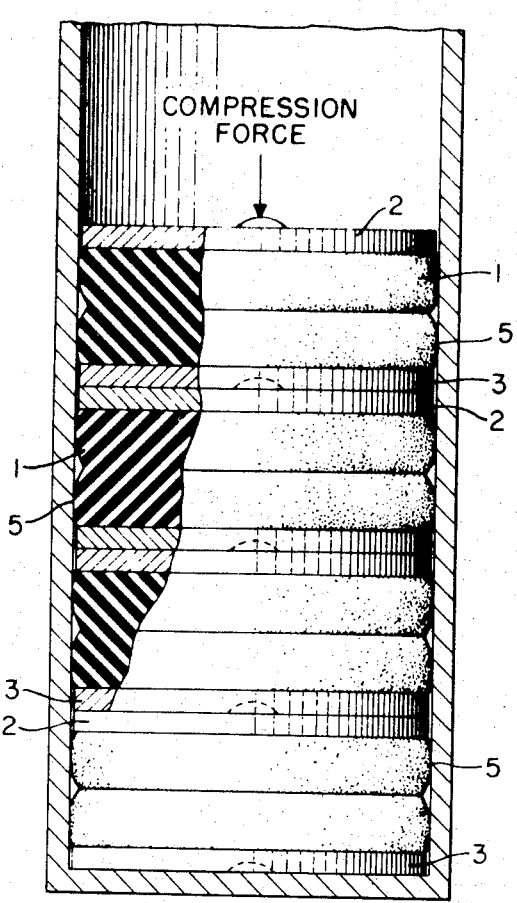
FIG. 3 is a vertical longitudinal sectional view of shock absorbing devices of the type shown in FIG. 1 and FIG. 2 placed in a supporting cylinder and disposed transversally to a compression force wherein the said shock absorbing devices are compressed to about 40 percent of their original height.
Figure 2:
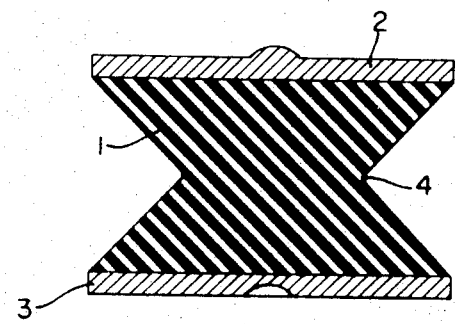
FIG. 2 is a vertical longitudinal sectional view further illustrating the shock absorbing device.

Referring to the drawings, the shock absorbing devices or units shown in FIG. 1 and FIG. 2 comprise the improved resilient, cured polyurea-urethane member (1) bonded or laminated to two opposite and substantially parallel force-receiving hot-rolled mild steel plates (2) and (3). A portion of the side-wall of the resilient polyurea-urethane member is concave in the form of a V-shaped groove (4). The ratio of the volume displaced by the groove to the volumes of the polyurea-urethane member plus that displaced by the groove times 100 is about equal to the percent compression anticipated. A suitable railroad draft gear can be formed as illustrated in FIG. 3 by combining several of the shock absorbing units of this invention to form a series of such units. As further shown by FIG. 3, under a suitable compression load, the resilient cured polyurea-urethane members deform and their side-walls are forced laterally outward (5).

The following examples further illustrate the objects and advantages of this invention. The parts and percentages are by weight unless otherwise indicated.

EXAMPLE I

To a reactor was charged, under essentially anhydrous conditions, 600 parts of a polytetramethylene ether glycol polymer having a molecular weight of about 1,000 and 600 parts of a polytetramethylene ether glycol having a molecular weight of about 2,000, these said polyether glycols or polyols having acid numbers of less than about 0.5. The polyol mixture was stirred and allowed to dry under a reduced pressure for about 1 hour at about 120° C. To the mixture was then added 416 parts of 3,3'-bitolylene-4,4'-diisocyanate. The resulting mixture was stirred and allowed to react under reduced pressure at about 120° C. for about 45 minutes. To the mixture was then added 133 parts of a blend of o-dichlorobenzidine and 4,4'-methylene bis (2-chloroaniline) in a weight ratio of 2 to 1. The resulting mixture was then immediately poured or cast into a mold in which had been inserted two circular hot-rolled mild steel metal plates having an SAE classification of about 10/20 and having diameters of about 6.5 inches and thicknesses of 135 mils. The plates had been coated with a polyester-polyisocyanate type of adhesive to enhance their adhesion to the cast polyurea-urethane. The mixture was cured in the mold at about 125° C. for about 16 hours to provide a polyurea-urethane steel laminate as a shock absorbing unit similar to that shown in FIGS. 1–3 in the drawing of this specification, the shaped resilient polyurea-urethane composition having a diameter of 6.5 inches and a thickness of 1.5 inches. Its sidewall was in the shape of a V-shaped groove having a volume equal to about ⅔ of the polyurea-urethane.

The shock absorbing unit deflected (compressed) about 0.4 to about 0.5 inch at about 25° C. upon the application of about 1800 pounds per square inch uniformly to the surface area of the steel force-receiving plates. Shock absorbers having polyurea-urethane members prepared according to this invention but having too low a mole ratio of diisocyanate to polymeric polyester, typically deflect more than about 0.6 inch when subjected to this test. Such shock absorbing units when used in a railroad car draft gear typically absorb insufficient amount of energy and, thus, are usually fully compressed before sufficient compressive force energy is absorbed by the gear during usage. Such shock absorbers having a polyurea-urethane member having too high a ratio of diisocyanate to polymeric polyester typically deflect less than about 0.30 inch when subjected to this test. When used in a railroad draft gear, they typically absorb an insufficient amount of energy before transmitting the energy, or force resulting from coupling the railroad car, through the draft gear and also break down during usage.

A portion of the polyurea-urethane was shaped and cured to form a disc having a diameter of about 1.13 inches and a thickness of about 0.5 inch. At about −40° C., a pressure applied to its flat surface of about 7400 pounds per square inch was required to compress the disc about 40 percent.

The shock absorbing unit was tested for endurance and successfully passed a −35° C. hammer drop test and an AAR endurance test.

Thus, the shock absorbing unit was considered acceptable for use in a railroad draft gear and also as a bridge support pad with good shock absorbing characteristics and endurance for a wide range of shock loads over a wide range of temperatures such as from about −40° C. to about 50° C.

A hammer drop test is described by first vertically loading a draft gear cylinder with 10 of the shock absorber units or pads similar to FIGS. 1–3 in series to a shock load with their adherent metal force-receiving plates facing each other to form a draft gear. A 27,000 pound hammer is dropped onto the end of the vertically positioned gear from several heights. The impact shock is measured, typically expressed as the height the hammer is dropped in inches, and the capacity of the gear is determined. The capacity of the gear is measured at the point where the gear "bottoms out," i.e., when it starts to transmit shock directly from the hammer drop rather than cushion and absorb the shock force. Thus, the gear can typically "bottom out" with 27,000 pound hammer being dropped from a height of about 18 inches for a 40,000 foot pound shock force. The draft gear is then cooled to −35° C. and drop hammered three times with the 27,000 pound hammer for the −35° F. hammer drop test. The capacity is measured and the gear disassembled followed by examining the pads. A criteria for failing the hammer drop test is deterioration of the pads such as cracking, particularly at −35° C., or by bottoming out at a shock load less than about 40,000 foot pounds at about 25° C.

The AAR Endurance Test (American Association of Railroads) can be referred to as AAR Spec. M-901-E Endurance Test. The test is generally similar to the hammer drop test but starting at room temperature or about 25° C. A 27,000 pound hammer is dropped at variable vertical heights of from about one to about 30 inches over a period of time until 35 million foot pounds of energy have been expended upon the gear which typically comprises 10 of the shock absorbing units or pads. The capacity of the gear is measured both at the beginning and at the end of the test as well as periodically during the test. The gear capacities before, during and after the test are then compared to determine any changes in capacity which the gear may undergo. The gear is then disassembled and inspected for deterioration of the pads. Appreciable loss of capacity or deterioration of the pads, such as by excessive cracking, are criteria for failing the endurance test. It is preferred that the gear, when composed of 10 of the pads, has a capacity of at least about 40,000 foot pounds before bottoming out, or a capacity of about 4,000 foot pounds per pad at about 25° C. In this test, the 27,000 pound hammer shocks are applied gradually over a period of time to prevent excessive heat build-up because the gear heats up considerably after each hammer drop.

EXAMPLE II

To a reactor was charged, under essentially anhydrous condition, 245 parts of a polytetramethylene ether glycol having a molecular weight of about 1,000, 577.5 parts of a polytetramethylene ether glycol having a molecular weight of about 2,000, these polyether glycols having an acid number of less than about 0.5, and 577.5 parts of a polyester of ε-caprolactone and diethylene glycol having a molecular weight of about 2,000 a hydroxyl number of about 59 and an acid number of about 0.05 with 14 parts of an amine antioxidant. The mixture was stirred and allowed to dry (as a precautionary measure for any potential water) under a reduced pressure for about 1 hour at about 120° C. To the reactor was then added 413 parts of 3,3′-bitoylene-4,4′-diisocyanate. The mixture was stirred and allowed to react under reduced pressure at about 120° C. for about 45 minutes. To the mixture was then added 50.83 parts of 4,4′-methylene-bis (2-chloroaniline) and 101.67 parts of o-dichlorobenzidine.

The resulting mixture was molded and cured to form the shaped polyurea-urethane-steel laminate according to the method of Example I and having the same dimensions.

The shock absorbing unit deflected (compressed) about 0.4 to about 0.5 inch at about 25° C. upon the application of about 1800 pounds per square inch uniformly to the surface area of the steel force-receiving plates.

A portion of the polyurea-urethane was shaped and cured to form a disc having a diameter of about 1.13 inches and a thickness of about 0.5 inch. At about −40° C., a pressure applied to its flat surface of about 6,000 pounds per square inch was required to compress the disc about 40 percent.

The shock absorbing unit was tested for endurance and successfully passed a −35° C. hammer drop test and an AAR endurance test.

Thus, the shock absorbing unit was considered acceptable for use in a railroad draft gear and also as a bridge support pad with good shock absorbing characteristics and endurance for a wide range of shock loads over a wide range of temperatures such as from about −40° C. to about 50° C.

The shock absorbing units of this invention and particularly as described in these examples, have unique utility as railroad draft gear shock absorbing units. In addition to the polyester polyols utilized in these examples with the polytetramethylene ether glycols to prepare the shock absorbing compositions having the required deflection and cold temperature characteristics as well as the desired dynamic endurance characteristic (AAR test), other polyester polyols can be used as exemplified in this specification. Particularly exemplary are tetramethylene adipate, 1,6-hexane diol adipate, tetramethylene azelate and 1,6-hexane diol azelate.

In practice, the shock absorbing device of a railroad draft gear is typically assembled by the series loading of 8 to 12, preferably 10, of the shock absorbing units of this invention and preferably of the prescribed 6.5 inch diameter shaped polyurea-urethane disc having the 1.5 inches thickness and V-grooved sides, followed by placing the units in the device under about 20,000 pounds force for operational use in the railroad car.

While certain representative embodiments and details have been shown for the purpose of illustrating the invention, it will be apparent to those skilled in this art that various changes and modifications may be made therein without departing from the spirit or scope of the invention.

We claim:

1. A shock absorbing device comprising a series of ten loaded resilient shock absorbing units, said device characterized by not bottoming out with a 27,000 pound hammer being dropped vertically on the device from a height of about 18 inches at about 25° C., further characterized by said shock absorbing units not cracking after dropping said hammer 3 times on the device at −35° C. and additionally characterized by passing the AAR Spec M–901–E Endurance Test, starting at about 25° C., by dropping said hammer at variable vertical heights of about 1 to about 30 inches until 35 million foot pounds of energy have been expended on the device, where each of said shock absorbing units is characterized by deflecting from about 0.3 to about 0.6 inch at about 25° C. upon the application of about 1800 pounds per square inch uniformly to the end surface areas of said resilient composition when the said composition is a generally disc shaped cylindrical element with circular parallel force receiving end surfaces having diameters of about 6.5 inches, each end surface being adhered to a metal plate, a height of about 1.5 inch, and a side-wall connecting the end surfaces substantially in the form of a V-shaped groove having substantially equal length sides, the said groove extending between the said end surfaces, the volume of the solid portion of the said element being about 150 percent of the volume of the said groove, and further characterized by a −40° C. cold temperature compression test where the said composition, at −40° C., when shaped and cured to a solid circular disc with a straight side-wall, having a diameter of about 1.13 inches and a thickness of about 0.5 inch, requires a maximum pressure of 7,500 pounds per square inch applied to its flat surfaces to compress the disc 40 percent, where said polyurea-urethane composition is prepared by the method which comprises reacting at least one diamine selected from the group consisting of orthodichlorobenzidine and 4,4'-methylene bis-orthochloroaniline with the reaction product of 3,3'-bitolylene-4,4'-diisocyanate and reactive hydrogen containing polymeric materials selected from (1) polytetramethylene ether glycols having an average molecular weight in the range of from about 800 to about 2200 with a total average molecular weight in the range of about 1200 to about 1500 or (2) a mixture of reactive hydrogen-containing materials comprising in the range of from about 30 to about 100 weight percent polytetramethylene ether glycols having an average molecular weight of from about 800 to about 2200 and correspondingly in the range of up to about 70 weight percent of polyester polyols having a molecular weight in the range of from about 800 to about 2200 selected from at least one of (a) caprolactone polyesters prepared from ε-caprolactone and glycols selected from diethylene glycol and straight chain hydrocarbon diols containing 4 to 6 carbon atoms, (b) adipates of adipic acid and straight chain aliphatic hydrocarbon diols containing 4 to 6 carbon atoms and (c) azelates of azelaic acid and straight chain aliphatic hydrocarbons diols containing 4 to 6 carbon atoms, with the requirements that the total average molecular weight of the mixture of polytetramethylene ether glycol and polyester polyol is in the range of about 1300 to about 1900, where the ratio of isocyanato groups of the diisocyanate to the sum of hydroxyl groups of the polyols is from about 1.7 to about 2.5, where the ratio of primary amino groups of the diamine to excess isocyanato groups over the sum of hydroxyl groups of the polyols is in the range of about 0.6 to about 1 and where the acid number of the polyols is less than about 1.

2. A shock absorbing device comprising a series of loaded resilient shock absorbing units, said device characterized by, when containing 10 of said shock absorbing units, not bottoming out with a 27,000 pound hammer being dropped vertically on the device from a height of about 18 inches at about 25° C., further characterized by said shock absorbing units not cracking after dropping said hammer 3 times on the device at −35° C. and additionally characterized by passing the AAR Spec M–901–E Endurance Test, starting at about 25° C., by dropping said hammer at variable vertical heights of about 1 to about 30 inches until 35 million foot pounds of energy have been expended on the device, where each of said shock absorbing units is characterized by deflecting from about 0.3 to about 0.6 inch at about 25° C. upon the application of about 1800 pounds per square inch uniformly to the end surface areas of said resilient composition when the said composition is a generally disc shaped cylindrical element with circular parallel force receiving end surfaces having diameters of about 6.5 inches, each end surface being adhered to a metal plate, a height of about 1.5 inches and a side-wall connecting the end surfaces substantially in the form of a V-shaped groove having substantially equal length sides, the said groove extending between the said end surfaces, the volume of the solid portion of the said element being about 150 percent of the volume of the said groove, and further characterized by a −40° C. cold temperature compression test where the said composition, at −40° C., when shaped and cured to a solid circular disc with a straight side-wall, having a diameter of about 1.13 inches and a thickness of about 0.5 inch, requires a maximum pressure of 7500 pounds per square inch applied to its flat surfaces to compress the disc 40 percent, where said polyureaurethane composition is prepared by the method which comprises reacting at least one diamine selected from the group consisting of orthodichlorobenzidine and 4,4'-methylene bis-orthochloroaniline with the reaction product of 3,3'-bitolylene-4,4'-diisocyanate and reactive hydrogen containing polymeric materials selected from (1) polytetramethylene ether glycols having an average molecular weight in the range of from about 800 to 2200 with a total average molecular weight in the range of about 1200 to about 1500 or (2) a mixture of reactive hydrogen-containing materials comprising in the range of from about 30 to about 100 weight percent polytetramethylene ether glycols having an average molecular weight of from about 800 to about 2200 and correspondingly in the range of up to about 70 weight percent of polyester polyols having a molecular weight in the range of about 800 to about 2200 selected from at least one of (a) caprolactone polyesters prepared from ε-caprolactone and glycols selected from diethylene glycol and straight chain hydrocarbon diols containing 4 to 6 carbon atoms, (b) adipates of adipic acid and straight chain aliphatic hydrocarbon diols containing 4 to 6 carbon atoms and (c) azelates of azelaic acid and straight chain alphatic hydrocarbon diols containing 4 to 6 carbon atoms, with the requirements that the total average molecular weight of the mixture of polytetramethylene ether glycol and polyester polyol is in the range of about 1300 to about 1900, where the ratio of isocyanato groups of the diisocyanate to the sum of hydroxyl groups of the polyols is from about 1.7 to about 2.5, where the ratio of primary amino groups of the diamine to excess isocyanato groups over the sum of hydroxyl groups of the polyols is in the range of about 0.6 to about 1 and where the acid number of the polyols is less than about 1.

(References on following page)

References Cited

UNITED STATES PATENTS

| | | | |
|---|---|---|---|
| 3,504,901 | 4/1970 | Ditty | 267—1 |
| 3,248,373 | 4/1966 | Barringer | 260—77.5 |
| 3,194,793 | 7/1965 | Kogon | 260—77.5 |
| 3,471,445 | 10/1969 | Carr | 260—75 |
| 3,677,869 | 7/1972 | Chung et al. | 161—42 |
| 3,463,758 | 8/1969 | Stewart | 260—75 |
| 3,457,234 | 7/1969 | Gianatasio | 260—75 NH |

OTHER REFERENCES

Wright et al.: Solid Polyurethane Elastomers, McLaren, London (1969) pp. 293 and 300.

"Isonate 136T," The Upjohn Company, Kalamazoo, Mich. (1966), 1 page.

H. S. COCKERAM, Examiner

U.S. Cl. X.R.

213—7; 248—358; 264—236; 267—138; 260—75 NK, 77.5 AN